Aug. 17, 1965   J. CHERUBIM   3,201,181
HYDROSTATIC BEARING
Filed Feb. 28, 1963
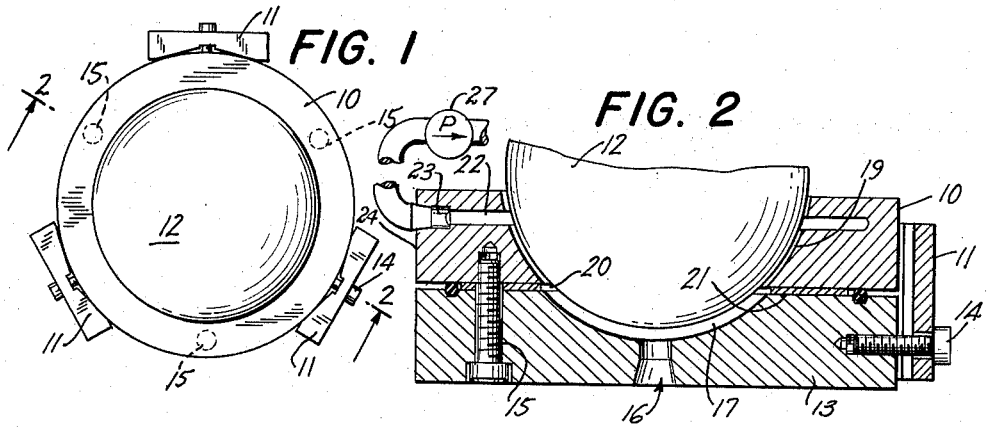
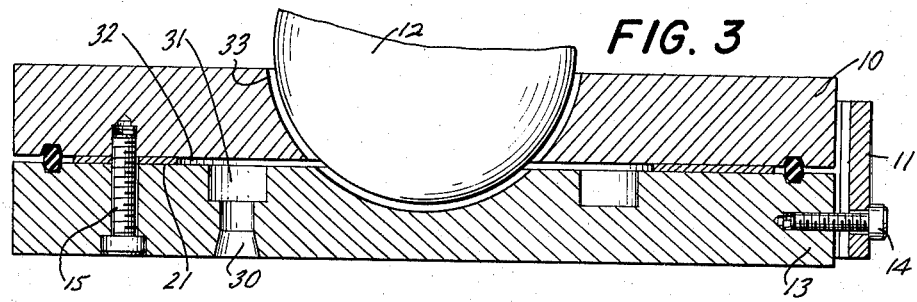
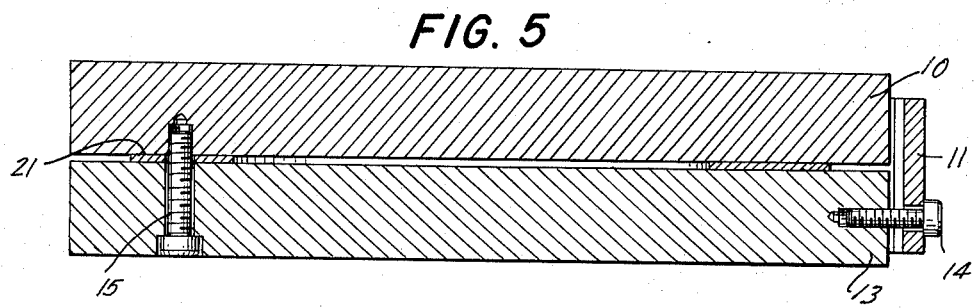
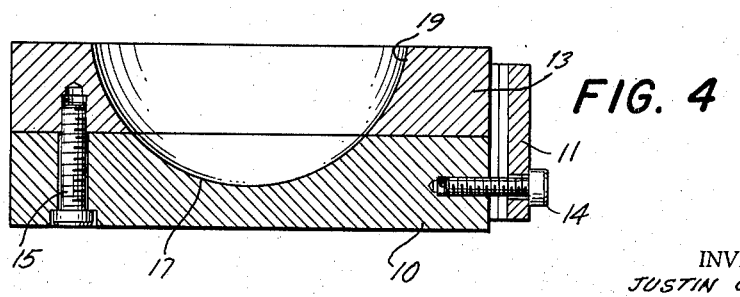
INVENTOR.
JUSTIN CHERUBIM
BY Charles Marks
ATTORNEY 3,201,181
HYDROSTATIC BEARING
Justin Cherubim, Wyandanch, N.Y., assignor to Industrial Tectonics, Inc., Ann Arbor, Mich., a corporation of Michigan
Filed Feb. 28, 1963, Ser. No. 261,761
8 Claims. (Cl. 308—9)

This invention relates generally to hydrostatic bearings and is particularly concerned with spherical, fluid film bearings.

It is an object of the present invention to provide an improved hydrostatically lubricated spherical, fluid film bearing.

Another object of the invention is to provide a spherical, fluid film bearing of the character indicated which is free to move with a minimum of friction.

Another object of the invention is to provide a spherical, fluid film bearing of the character indicated which minimizes any torque resulting from the flow of the lubricant therein.

Another object of the invention is to provide a spherical, fluid film bearing of the character indicated having means for adjusting the size of the outlet for exhausting the lubricant employed therein.

Another object of the invention is to provide a spherical, fluid film bearing of the character indicated having means for directing the exhaust of the lubricant employed therein so as to avoid any desirable impingement of such exhaust lubricant upon the structure supported by the bearing.

A further object of the invention is to provide a spherical, fluid film bearing of the character indicated which is provided with a bearing cavity having an extremely high degree of symmetry.

A further object of the invention is to provide a spherical, fluid film bearing of the character indicated wherein the moving parts are substantially free from asymmetrical bearing flow and consequent viscous drag.

A further object of the invention is to provide an improved method for the manufacture of spherical hydrostatic bearings.

A still further object of the invention is to provide a spherical, hydrostatic bearing of the character indicated which is of simple and economical design.

Other and further objects and advantages of the present invention will become apparent from the following description as read in connection with the accompanying drawing.

In the drawing:

FIGURE 1 is a plan view of one embodiment of the present invention;

FIGURE 2 is a cross-sectional view taken about the line 2—2 of FIGURE 1;

FIGURE 3 is a cross-sectional view similar to that of FIGURE 2 but showing a modified form of the invention;

FIGURE 4 is a cross-sectional view of a portion of the bearing elements depicted in FIGURE 2 and showing these elements at one stage in their manufacture;

FIGURE 5 is a cross-sectional view of a portion of the bearing elements depicted in FIGURE 3 and showing these elements at one stage in their manufacture.

Throughout the several views, similar numerals are employed to refer to similar parts of the invention.

The hydrostatically lubricated bearing which is the subject of the present invention employs a lubricant such as air, water, oil, nitrogen or other suitable fluid which supports a rotatable sphere in a suitable curved cavity. Thus, as shown in FIGURE 1 of the drawing, one embodiment of the invention comprises an annular block generally designated by the numeral 10 and disposed in contact with suitable V-blocks 11. As hereinafter more fully described, the annular block 10 is provided with a rotatable sphere 12, which is surmounted in the conventional manner by a structure (not shown) intended to be supported by the bearing.

As may be seen in FIGURE 2, each V-block 11 is secured to a base 13 by means of a suitable fastening means such as screw 14 which extends through each V-block 11 and is threadedly engaged with the said base 13. The base 13 is surmounted by the aforementioned annular block 10 and is secured thereto by a plurality of screws 15.

An important feature of the present invention resides in the means for accomplishing the construction of the passageways which conduct the fluid lubricant into contact with the rotatable sphere 12 and which thereafter exhaust such fluid lubricant. Thus, as may be seen in FIGURE 2 of the drawing, the base 13 is provided with an inlet aperture 16 communicating with a concave region 17 defined by the surface of the rotatable sphere 12 and of a curved depression 18 provided in the base 13. The fluid lubricant, such as air, for example may be introduced under a suitable pressure through the inlet aperture 16 and into the concave region 17 where said lubricant forms a fluid film which supports the rotatable sphere 12.

The fluid lubricant also communicates with a curved intermediate passage 19 formed in the manner hereinafter set forth and defined by the surface of the rotatable sphere 12 and the internal periphery 25 of the annular block 10. This intermediate passage 19 permits a limited removal or "bleeding off" of the fluid lubricant contained within the concave region 17. It will be noted that this limited removal of the fluid lubricant is determined by the fact that the width of the intermediate passage 19 is quite small as compared with the width of the concave region 17.

For the purpose of the present discussion, the bearing cavity provided in the form of the invention depicted in FIGURE 2 will be deemed to include the depression defined by the surfaces of the concave region 17, the intermediate passage 19 and of a slotted region 20 adjacent to the rotatable sphere 12 and provided between the base 13 and the annular block 10. Thus, it will be seen that the bearing cavity is "stepped," i.e., that the upper internal periphery 25 of the annular block 10 is much closer to the rotatable sphere 12 than is the surface of the curved depression 18.

It has been found in practice that such conformation is difficult to achieve by conventional methods and that it may be desirable in practice to vary the amount of such offset from time to time. Such problems are particularly great where, as is so frequently the case in conventional bearings, the base and annular block are formed integrally. However, in the present instance these problems are easily solved.

Thus, in forming the bearing cavity, upper and lower, laterally extending members are first stacked in the relative positions of the base 13 and annular block 10, as shown in FIGURE 4. These upper and lower members may be suitably fastened together as by the screws 15 and V-blocks 11, and thereafter, while these upper and lower members are thus disposed together, those portions of the aforesaid bearing cavity which comprise the curved depression 18 and the internal periphery 25 of the annular block 10 are machined or otherwise formed so as to acquire the same radius of curvature as that of the surface of the rotatable sphere 12. It will be seen that with this arrangement, the surface of the curved depression 18 is aligned with the internal periphery 25 of the annular block 10.

Thereafter, the aforesaid stepped conformation of the bearing cavity may be accomplished by disposing between the annular block 10 and base 13, a suitable spacing member such as an annular shim 21 of any desired thickness. It will be seen that by selecting shims of greater or lesser thickness and disposing them in the above-indicated manner, it will be possible to vary the extent of the stepped conformation within the bearing cavity. Moreover, since shim stock is commonly available in very small and precisely determined thicknesses, it will be seen that a very fine degree of adjustability of the extent of such "stepping" may be had.

It is also worthy of note that the inlet passage 16 extends coaxially with the vertical axis of the bearing cavity and of the rotatable sphere 12. Hence, any fluid lubricant which is introduced to the bearing cavity does not exert an asymetrical force or pressure upon the surface of the sphere 12; and thereafter the uniform cross-sectional area existing in each of the various parts of the bearing cavity, preserves a symmetrical pressure distribution upon the surface of the sphere 12.

As seen in FIGURE 2, a horizontal exhaust region 22, of generally annular conformation, communicates between the intermediate passage 19 and an outlet passage 23 connected to the circumferential periphery 24 of the annular block 10. This outlet passage 23 may be in communication with the external atmosphere or with a pump 27 which may be in the form of a vacuum pump when the fluid lubricant is gaseous in nature. Since the cross-sectional area of the exhaust region is great as compared with that of the intermediate passageway, the lubricant will be induced to flow therefrom into the exhaust region and thence through the outlet passage 23. Such flow is especially marked where the pressure within the exhaust region 22 is reduced as by means of the aforementioned vacuum pump. Hence, it will be seen that by this arrangement, the exhausted lubricant does not impinge upon any structure disposed above the sphere 12 so as to upset the balance of such structure.

A suitable O-ring 26 may be provided externally of the shim and between the base 13 and annular block 10 according to conventional practice.

A modified form of the invention is depicted in FIGURE 3 of the drawing. In this embodiment of the invention, the bearing cavity is formed without the stepped conformation previously discussed. As may be seen in FIGURE 3, the annular block 10 is disposed above the base 13 and secured against lateral displacement by the V-blocks 11, all in the manner previously described. So, also, the annular block 10 and base 13 are secured by the vertical bolts 15 and spaced apart as by a suitable annular shim 21.

However, in this form of the invention, an inlet passage 30 is provided laterally of the vertical axis of the sphere 12 and bearing cavity. This inlet passage 30 communicates with an annular plenum chamber 31. This plenum chamber 31, in turn, communicates with the slotted region 32 between the annular block 10 and base 13, which slotted region is disposed coaxially with respect to the plenum chamber and the bearing cavity and sphere 12. Hence, any fluid lubricant introduced by way of the inlet passage 30, plenum chamber 31 and slotted region 32, is permitted to assume a uniform pressure distribution which will thereby avoid any asymmetrical force or pressure distribution upon the sphere 12 when such lubricant is introduced into the bearing cavity.

As may be seen in FIGURE 5 of the drawing, the annular block 10 and base 13 of the aforesaid modified form of the invention may also be easily made by disposing the annular shim 21 between upper and lower laterally extending members, fastening them together in stacked relation, as by screws 15 and V-blocks 11, and then machining or otherwise forming the bearing cavity while these upper and lower members are thus disposed together, so as to provide a bearing cavity characterized by aligned curved surfaces which will be concentric with that of the sphere 12 (and have a larger radius than that of the sphere).

The remaining portions of the annular block 10 and base 13 may be formed in any desired manner.

As in the case of the first described form of the invention, the height of the slotted region 32 may be finely adjusted by varying the thickness of the shim 21. In this way, the available flow of the fluid lubricant will be correspondingly adjustable.

It will also be seen that in this form of the invention, the fluid lubricant may be exhausted to the external atmosphere by way of the upper portion 33 of the bearing cavity in those cases where the direction of such exhaust is of no concern. Of course, if desired, a horizontal exhaust chamber and outlet may be provided as in the first described form of the invention.

It will be seen from the foregoing that the invention achieves its objectives in a simple and ingenious manner and that it is adapted to employing a variety of lubricants such as water, oil, air, nitrogen, inert gases or other suitable fluids.

The embodiments of the invention illustrated and described hereinabove have been selected for the purpose of clearly setting forth the principles involved. It will be apparent, however, that the present invention is susceptible to being modified in respect to details of construction, procedure, combination and arrangement of parts which may be resorted to without departure from the spirit and scope of the invention as claimed.

I claim:
1. In a hydrostatic bearing, the combination comprising:
   (a) a base;
   (b) an annular block surmounting said base;
   (c) a bearing cavity provided within said base;
   (d) said annular block including an inlet aperture axially communicating with said bearing cavity;
   (e) an annular shim being disposed between said base and annular block, thereby disposing said base and annular block in spaced relation,
   (f) at least one threaded member extending into said base and annular block, whereby said annular shim and annular block are affixed to said base;
   (g) said bearing cavity receiving a fluid lubricant through said inlet aperture;
   (h) said fluid lubricant forming a fluid film between the surface of said bearing cavity and the surface of a rotatable sphere received within said bearing cavity;
   (i) said rotatable sphere being adapted to support a vertically disposed superstructure;
   (j) the annular block including a laterally extending slot communicating between the bearing cavity and an exhaust passage, whereby said fluid lubricant may be removed from said bearing cavity;
   (k) the cross-sectional area of the laterally extending slot being greater than the cross-sectional area between the adjacent surface of the bearing cavity and the surface of the rotatable sphere; and
   (l) at least one V-block engaged with the external peripheries of said base and block, thereby maintaining in alignment the portions of the bearing cavity provided in said base and block.

2. In a hydrostatic bearing, the combination comprising:
   (a) a base;
   (b) an annular block surmounting said base;
   (c) a bearing cavity provided within said base;
   (d) said annular block including an inlet aperture communicating with an annular plenum chamber;
   (e) an annular shim being disposed between said base and annular block, thereby disposing said base and annular block in spaced relation;
   (f) the spaced region between said base and annular block communicating between said plenum chamber and said bearing cavity;

(g) said bearing cavity receiving a fluid lubricant through said inlet aperture, plenum chamber and spaced region;

(h) said fluid lubricant forming a fluid film between the surface of said bearing cavity and the surface of a rotatable sphere received within said bearing cavity;

(i) said rotatable sphere being adapted to support a vertically disposed superstructure.

3. In a device according to claim 2, (a) at least one threaded member extending into said base and annular block, whereby said annular shim and annular block are affixed to said base;

(b) at least one V-block engaged with the external peripheries of said base and block, thereby maintaining in alignment the portions of the bearing cavity provided in said base and block.

4. In a hydrostatic bearing, the combination comprising:

(a) a base;
(b) a hollow block surmounting said base;
(c) a bearing cavity provided within said base and block and communicating with a fluid lubricant;
(d) a rotatable sphere received within said bearing cavity;
(e) the conformation of the surface of said bearing cavity being determined by means disposed intermediately of said base and block;
(f) said intermediately disposed means including an annular shim engaged with said base and block;
(g) the conformation of the surface of said bearing cavity including a curved depression provided within said base and the internal periphery of said block;
(h) the thickness of said annular shim determining the proximity of the internal periphery of the block and the surface the rotatable sphere;
(i) the distance between said curved depression of said base and the surface of the rotatable sphere being greater than the distance between the internal periphery of the block and the surface of said rotatable sphere.

5. In a hydrostatic bearing, the combination comprising:

(a) a base;
(b) a hollow block surmounting said base;
(c) a bearing cavity provided within said base and block and communicating with a fluid lubricant;
(d) a rotatable sphere received within said bearing cavity;
(e) the conformation of the surface of said bearing cavity being determined by means disposed intermediately of said base and block;
(f) said rotatable sphere being adapted to support a vertically disposed superstructure;
(g) said bearing cavity communicating with means for exhausting said lubricant from said bearing cavity;
(h) said exhaust means being directed laterally of said block.

6. In a hydrostatic bearing, the combination comprising:

(a) a base;
(b) a hollow block surmounting said base;
(c) a bearing cavity provided within said base and block and communicating with a fluid lubricant;
(d) a rotatable sphere received within said bearing cavity;
(e) the conformation of the surface of said bearing cavity being determined by means disposed intermediately of said base and block;
(f) said rotatable sphere being adapted to support a vertically disposed superstructure;
(g) said bearing cavity communicating with means for exhausting said lubricant from said bearing cavity;
(h) said exhaust means being directed laterally of said block;
(i) said exhaust means including an annular slot formed in said block; and
(j) a passage communicating between said annular slot and the external periphery of said block.

7. In a hydrostatic bearing, the combination comprising:

(a) a base;
(b) a hollow block surmounting said base;
(c) a bearing cavity provided within said base and block and comunicating with a fluid lubricant;
(d) a rotatable sphere received within said bearing cavity;
(e) the conformation of the surface of said bearing cavity being determined by means disposed intermediately of said base and block;
(f) said rotatable sphere being adapted to support a vertically disposed superstructure;
(g) said bearing cavity communicating with means for exhausting said lubricant from said bearing cavity;
(h) said exhaust means being directed laterally of said block;
(i) said exhaust means including an annular slot formed in said block; and
(j) a passage communicating between said annular slot and the external periphery of said block;
(k) the said passage being connected to pump means for reducing the pressure within said annular slot.

8. In a hydrostatic bearing, the combination comprising.

(a) a base;
(b) a hollow block surmounting said base;
(c) a bearing cavity provided within said base and block and communicating with a fluid lubricant;
(d) a rotatable sphere received within said bearing cavity;
(e) the conformation of the surface of said bearing cavity being determined by means disposed intermediately of said base and block;
(f) said intermediately disposed means including an annular shim engaged with said base and block;
(g) the conformation of the surface of said bearing cavity including a curved depression provided within said base and the internal periphery of said block;
(h) the thickness of said annular shim determining the proximity of the internal periphery of the block and the surface of the rotatable sphere;
(i) the conformation of said bearing cavity being adjustable upon replacement of said annular shim by an annular shim of different thickness.

References Cited by the Examiner

UNITED STATES PATENTS

| | | | |
|---|---|---|---|
| 1,960,956 | 5/34 | Riedel | 29—149.5 |
| 2,100,218 | 11/37 | Kelley | 308—159 |
| 2,229,428 | 1/41 | Thiebaud | 308—159 |
| 2,342,055 | 2/44 | Laboulais | 308—158 |
| 2,951,729 | 9/60 | Skarastrom | 308—9 |
| 3,043,635 | 7/62 | Bard | 308—9 |
| 3,059,318 | 10/62 | Herbert et al. | 29—149.5 |

FOREIGN PATENTS 725,281  3/55  Great Britain.

ROBERT C. RIORDON, *Primary Examiner.*

FRANK R. SUSKO, *Examiner.*